(12) United States Patent
Cheng et al.

(10) Patent No.: US 7,937,478 B2
(45) Date of Patent: May 3, 2011

(54) APPARATUS, SYSTEM, AND METHOD FOR COOPERATION BETWEEN A BROWSER AND A SERVER TO PACKAGE SMALL OBJECTS IN ONE OR MORE ARCHIVES

(75) Inventors: Long Cheng, Beijing (CN); Catherine C. Diep, Cupertino, CA (US); Dong Jun Lan, Beijing (CN); Sheng S. Lu, Beijing (CN); Luis J. Ostdiek, San Francisco, CA (US); Qing Bo Wang, Beijing (CN); Meng Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/847,287

(22) Filed: Aug. 29, 2007

(65) Prior Publication Data

US 2009/0063621 A1    Mar. 5, 2009

(51) Int. Cl.
*G06F 15/16* (2006.01)
(52) U.S. Cl. ........................................ 709/227; 709/203
(58) Field of Classification Search .................... 709/227
See application file for complete search history.

(56) References Cited

U.S. PATENT DOCUMENTS

| | | | | |
|---|---|---|---|---|
| 6,185,625 | B1 | 2/2001 | Tso et al. | 709/247 |
| 6,195,692 | B1 * | 2/2001 | Hsu | 725/110 |
| 6,427,149 | B1 * | 7/2002 | Rodriguez et al. | 709/219 |
| 6,560,618 | B1 | 5/2003 | Ims | |
| 6,915,328 | B2 | 7/2005 | Turnbull | 709/203 |
| 6,928,471 | B2 | 8/2005 | Pabari et al. | 709/223 |
| 6,947,440 | B2 * | 9/2005 | Chatterjee et al. | 709/219 |
| 7,031,968 | B2 * | 4/2006 | Kremer et al. | 707/100 |
| 7,032,183 | B2 | 4/2006 | Durham | 715/823 |
| 7,047,318 | B1 | 5/2006 | Svedloff | 709/246 |
| 7,099,927 | B2 | 8/2006 | Cudd et al. | 709/217 |
| 7,231,644 | B2 | 6/2007 | Kieffer | |
| 7,349,944 | B2 * | 3/2008 | Vernon et al. | 709/217 |
| 2002/0025001 | A1 | 2/2002 | Ismaeil et al. | |
| 2002/0029228 | A1 | 3/2002 | Rodriguez et al. | 707/204 |
| 2002/0065800 | A1 | 5/2002 | Morlitz | |
| 2002/0083097 | A1 | 6/2002 | Warrington | 707/513 |
| 2002/0147735 | A1 * | 10/2002 | Nir | 707/200 |
| 2002/0188728 | A1 * | 12/2002 | Ballard | 709/227 |

(Continued)

OTHER PUBLICATIONS

Wills et al, "Using Bundles for Web Content Delivery" Computer Networks, Elsevier Science Publishers B.V., Amersterdam, NL, vol. 42, No. 6, Aug. 21, 2003, pp. 797-817.

(Continued)

*Primary Examiner* — Dohm Chankong
*Assistant Examiner* — Neeraj Utreja
(74) *Attorney, Agent, or Firm* — Kunzler Needham Massey & Thorpe

(57) ABSTRACT

An apparatus, system, and method are disclosed for reducing the loading time of a web page. In one embodiment, the apparatus, system, and method comprise requesting a web page from a web server, wherein requesting a web page from a web server comprises sending a browser parameter comprising an indicator to the web server, the indicator indicating that a browser is capable of receiving an archive. The present invention may further comprise receiving one or more archives from the web server, the one or more archives each comprising a plurality of archivable objects referenced by the web page, and rendering the web page using the plurality of archivable objects from the one or more archives.

23 Claims, 10 Drawing Sheets

U.S. PATENT DOCUMENTS

| | | | |
|---|---|---|---|
| 2003/0033448 A1 | 2/2003 | Kieffer | 709/331 |
| 2003/0200175 A1 | 10/2003 | Wang et al. | |
| 2004/0034647 A1 | 2/2004 | Paxton et al. | 707/102 |
| 2004/0073670 A1* | 4/2004 | Chack | 709/225 |
| 2004/0255233 A1 | 12/2004 | Croney et al. | 715/500 |
| 2005/0044490 A1 | 2/2005 | Massasso et al. | 715/517 |
| 2005/0065800 A1 | 3/2005 | Green et al. | 705/1 |
| 2005/0108259 A1 | 5/2005 | Watanabe et al. | 707/100 |
| 2005/0180661 A1 | 8/2005 | El Bernoussi et al. | |
| 2006/0235906 A1 | 10/2006 | Brinkmoeller et al. | 707/204 |
| 2007/0233898 A1 | 10/2007 | Raviv et al. | |

OTHER PUBLICATIONS

Loukopoulos, T. et al., "Optimizing Download Time of Embedded Multimedia objects for Web Browsing," AN-8131964, Hong Kong University, Hong Kong, Oct. 2004.

Rodriguez, P. et al., "Session Level Techniques for Improving Web Browsing Performance on Wireless Links", Microsoft research, Bell Lab, May 2004.

Olshefski, D. et al., "Understanding the Management of Client Perceived Response Time", IBM research, Columbia University, Jun. 2006.

Lai, AM. et al., "Improving Web Browsing on Wireless PDAs Using Thin-Client Computing", Columbia University, May 2004.

Dufour, B. et al., "Dynamic Metrics for Java", McGill University, Oct. 2003.

Eng Huat Ng et al.; Web Page Reuse Techniques: A Dynamic Referential Navigational Guide, E-Commerce Group, 2000.

Office Action received from USPTO, U.S. Appl. No. 11/781,066, received Nov. 15, 2010.

* cited by examiner

APPARATUS, SYSTEM, AND METHOD FOR COOPERATION BETWEEN A BROWSER AND A SERVER TO PACKAGE SMALL OBJECTS IN ONE OR MORE ARCHIVES

CROSS-REFERENCES TO RELATED APPLICATIONS

This application is related to the U.S. Patent Applications entitled "Apparatus, System, and Method for Cooperation Between a Browser and a Server to Package Small Objects in one or more Archives" to Long Cheng, Catherine C. Diep, Dong Jun Lan, Sheng Lu, Luis J. Ostdiek, Qing Bo Wang, and Meng Ye having Ser. No. 11/847,299 and filed on Aug. 29, 2007 and "Apparatus, System, and Method for Archiving Small Objects to Improve the Loading Time of a Web Page" to Catherine C. Diep, Xing X. Fang, Dong Jun Lan, Sheng S. Lu, Luis J. Ostdiek, Qing Bo Wang, Meng Ye having Ser. No. 11/781,066 and filed on Jul. 20, 2007.

BACKGROUND OF THE INVENTION

1. Field of the Invention

This invention relates to web pages and more particularly relates to improving load times for web pages.

2. Description of the Related Art

The Internet has emerged as the default platform for business and personal application development. The demand to build Internet applications of increasing usability has magnified the adoption of multimedia technology to represent a better user experience. The result is that a normal web page usually comprises a large number of image resources, executable scripts and style definitions. The file size of each of these resources is small, usually less than 1K. When these small resources are deployed on web servers, they typically have high overhead requirements, resulting in relatively high demands on network bandwidth and server workload.

The network overhead requirements of the resources include protocol headers, HTTP headers, TCP headers, and IP headers. The average HTTP header is more than 300 bytes for a single HTTP request or response, thus in one request/response interaction, there are more than 600 to 700 bytes HTTP of headers. As stated above, the size of objects in many web pages is already very small, so the unnecessary cost of HTTP headers is considerable. The smaller the object is, the larger the overhead ratio is. Since the headers contributing to the overhead requirements of each request are a fundamental part of the current structure of the Internet, little can be done to reduce them.

In addition to delays caused by overhead, when a web page is accessed by a browser, the browser sends a request for each object in the web page and waits for a response for each object. This creates another "round-trip time" delay that compounds the overhead delays caused by headers and the like. When a web page consists of many small objects, the wait times for the objects are cumulative and further delay loading.

SUMMARY OF THE INVENTION

From the foregoing discussion, it should be apparent that a need exists for an apparatus, system, and method for reducing the load time of a web page. Beneficially, such an apparatus, system, and method would involve both the browser and the web server acting in cooperation to reduce the load time of the web page.

The present invention has been developed in response to the present state of the art, and in particular, in response to the problems and needs in the art that have not yet been fully solved by currently available web page transmission techniques. Accordingly, the present invention has been developed to provide an apparatus, system, and method for reducing the load time of web pages that overcome many or all of the above-discussed shortcomings in the art.

A system of the present invention is presented to reduce the load time of a web page. The system may be embodied by a web browser, a web server, and an archiver. In particular, the system, in one embodiment, includes a web browser configured to request a web page from a web server, receive one or more archives, the one or more archives comprising one or more archivable objects referenced in the web page, and render the web page using archivable objects from the one or more archives. The web server may be configured to receive a request for a web page from the browser, and deliver one or more archives, wherein each of the one or more archives comprises a plurality of archivable objects referenced within the web page. The archive may be configured to optimize a selection of archivable objects for one or more archives for the web page, and generate one or more archives from the optimized selection of archivable objects.

The browser in the system may further be configured to send a browser parameter comprising an indicator that the browser is configured to receive one or more archives. In another embodiment, the browser sends a browser parameter comprising an indicator that the browser is configured to receive a maximum number of available connections for the browser.

In certain embodiments of the system, the archiver is further configured to determine archive response parameters compatible with the capabilities of the browser by determining an optimal number of connections to use to deliver the one or more archives. The archiver, in a further embodiment, generates a number of archives equal to the determined optimal number of connections to use to deliver the one or more archives. In another embodiment, the archiver determines response parameters compatible with the capabilities of the browser by transmitting an archive response parameter to the browser, wherein the archive response parameter comprises an indicator that the archiver is configured to generate one or more archives and available connections for the web server and determining a maximum number of connections to use to deliver the one or more archives.

In one embodiment of the system, the browser is further configured to send a browser parameter to the web server by transmitting a list of pre-cached objects present in a browser cache from a previous interaction with the web server, the pre-cached objects associated with the web page. In another embodiment, the archiver determines archive response parameters compatible with the capabilities of the browser by comparing the list of pre-cached objects present in the browser cache to the archivable objects referenced in the web page, determining archivable objects absent from the list of pre-cached objects, and selecting archivable objects that are absent from the browser cache for one or more archives.

A computer program product comprising a computer readable medium having computer usable program code programmed for reducing loading time of a web page is provided. The computer program product, in one embodiment, comprises instructions for operations comprising receiving a browser parameter, wherein the browser parameter comprises an indicator that the browser is configured to receive one or more archives and available connections for a browser. The computer program product may further comprise instructions for operations for determining a number of connections to use to deliver one or more archives and optimizing a selection of archivable objects for one or more archives for a web page.

In certain embodiments, the computer program product includes instructions for generating a number of archives equal to the number of connections to use to deliver one or more archives, the one or more archives comprising the optimized selection of archivable objects. In another embodiment, the computer program product includes operations for delivering the one or more archives, wherein each of the one or more archives comprises a plurality of archivable objects referenced within the web page. In one embodiment, optimizing a selection of archivable objects further comprises selecting archivable objects for inclusion in one or more archives to be generated by the archiver, the content of the archives comprising one or more archivable objects from the web page according to an object prioritization.

Optimizing a selection of archivable objects, in one embodiment of the computer program product, further comprises scanning a document object model (DOM) tree indicating the structure of the web page to determine the objects referenced within the web page. In another embodiment, optimizing a selection of archivable objects further comprises assigning a priority to the archivable objects according to one or more prioritization criteria. The prioritization criteria may comprise a number of descendent objects of the object in the DOM tree. The prioritization criteria may comprise a hierarchical level of the object in a document object master (DOM) tree.

In one embodiment of the computer program product, selecting archivable objects for inclusion in one or more archives comprises selecting an archivable object for inclusion in response to a determination that a size of the object is less than a threshold size. In another embodiment, selecting archivable objects for inclusion in one or more archives comprises selecting an object for inclusion in response to a determination that the archivable object is absent from a list of pre-cached archivable objects present in a browser cache from a previous interaction with the web server.

In one embodiment of the computer program product, generating a number of archives further comprises sorting the archivable objects in the one or more archives according to priority, such that higher priority archivable objects are closer to a beginning of the archive than lower priority archivable objects. Generating a number of archives may comprise sorting the selected archivable objects according to a priority, creating a bin for each archive, and adding archivable objects to each bin according to the sorted order in response to a total size of the objects in the bin remaining less than a target size. In one embodiment, generating a number of archives further comprises compressing the one or more archives.

A method of the present invention is also presented for deploying computing infrastructure comprising integrating computer-readable code into a computing system, wherein the code in combination with the computing system is capable of requesting a web page from a web server, wherein requesting a web page from a web server comprises sending a browser parameter comprising an indicator to the web server, the indicator indicating that a browser is capable of receiving an archive. In one embodiment, the code in combination with the computer system is further capable of receiving one or more archives from the web server, the one or more archives each comprising a plurality of archivable objects referenced by the web page. In another embodiment, the code in combination with the computer system is capable of rendering the web page using the plurality of archivable objects from the one or more archives.

In another embodiment, the code in combination with the computer system is capable of receiving an archive response parameter from the web server, the archive response parameter comprising an indication that the web server is capable of delivering an archive. The code in combination with the computer system, in one embodiment, is further capable of determining a number of connections available for use by the browser to receive the web page. In another embodiment, the code in combination with the computer system is capable of sending a browser parameter comprising a connections indicator, the connections indicator indicating the number of connections available for use by the browser to receive portions of the web page.

The method may further include establishing connections with the web server according to an archive response parameter from the web server and the number of connections available for use by the browser. In another embodiment, the method includes transmitting a list of archivable objects retained by the browser in a cache from a previous interaction with the web server. The method may further include extracting archivable objects from the one or more archives.

In certain embodiments, the rendering the web page further comprises storing the archivable objects in a cache. In another embodiment rendering the web page further comprises displaying an archivable object from an archive on a display device. In a further embodiment, rendering the web page further comprises decompressing a compressed archive.

A method for reducing the load time of a web page is also provided. The method in the disclosed embodiments substantially includes the steps necessary to carry out the functions presented above with respect to the operation of the described apparatus and system. In one embodiment, the method includes determining a number of connections available for use by a browser to receive a web page. The method also may include requesting a web page from a web server. Requesting a web page may comprise sending a browser parameter comprising an indicator indicating that the browser is capable of receiving an archive and an indicator indicating the number of connections available for use by the browser to receive portions of the web page.

The method in one embodiment, includes receiving an archive response parameter from the web server, the archive response parameter comprising an indicator indicating that the web server is capable of delivering an archive. The method may further include establishing one or more connections with the web server according to the archive response parameter from the web server and the browser parameter. In one embodiment, the method includes receiving one or more archives from the web server, the one or more archives each comprising a plurality of archivable objects associated with the web page. The method may further include rendering the web page using the plurality of archivable objects from the one or more archives.

A computer program product comprising a computer readable medium having computer usable program code programmed for reducing loading time of a web page is also provided. The operations of the computer program product, in one embodiment, include determining a number of archives to generate and selecting archivable objects for inclusion in one or more archives to be generated by the archiver, the selected archivable objects comprising one or more archivable objects associated with the web page according to an object prioritization wherein an archivable object is selected in response to a determination that the archivable object has a size below a threshold value. In one embodiment, the computer program product includes operations for optimizing the selected archivable objects for one or more archives for a web page. The computer program product may also include operations for generating a number of archives equal to the determined number of archives, the archives comprising the optimized selection of archivable objects.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
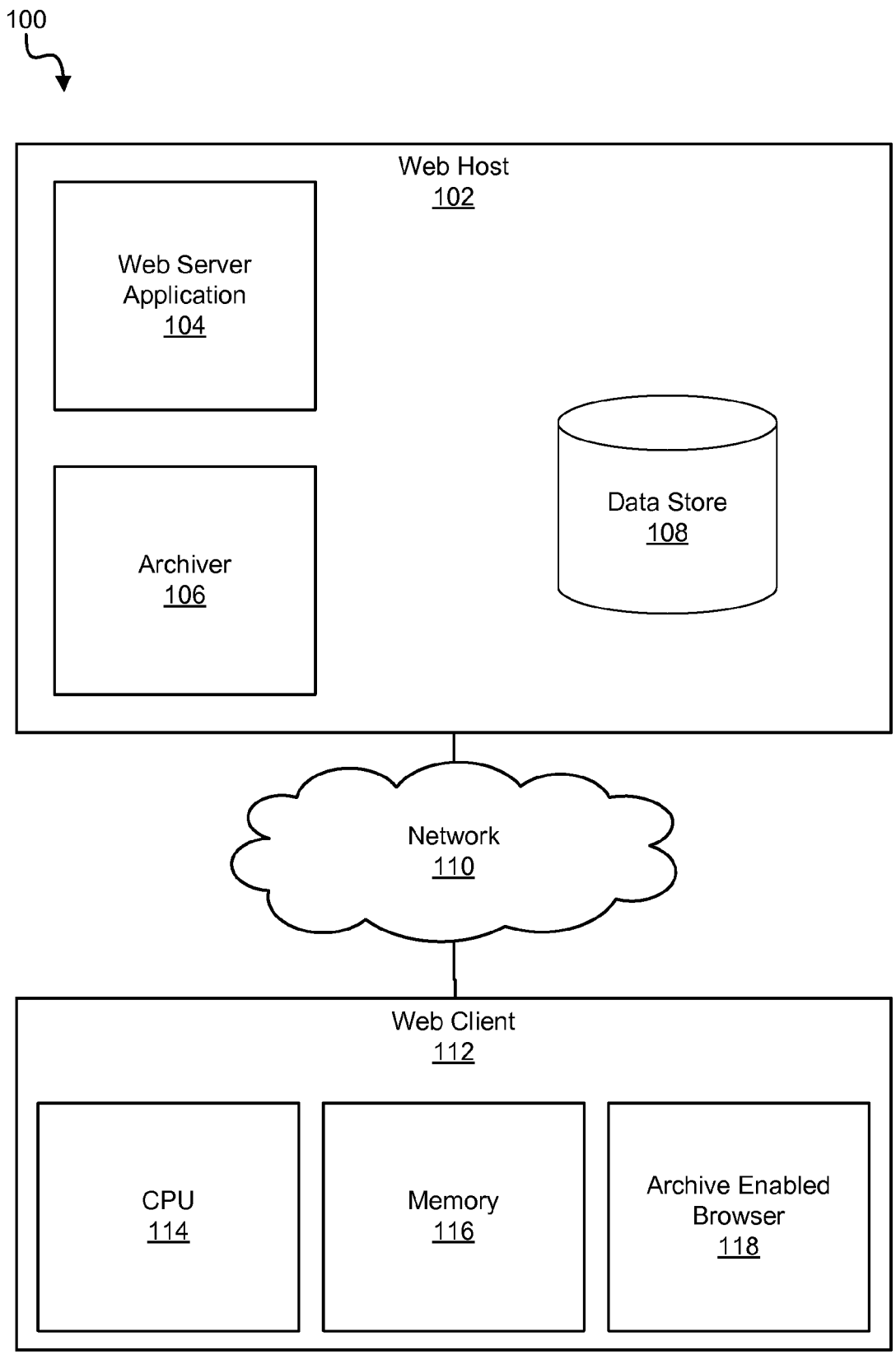
FIG. 1 is a schematic block diagram illustrating one embodiment of a system for improving the download time of a web page in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors that communicate with different forms of memory. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for improving the download time of a web page. The system 100 may include a web host 102 with a web server application 104, an archiver 106, and a data store 108. The system 100 may further include a network 110 and a web client 112 with a central processing unit (CPU) 114, memory 116, and an archive enabled browser 118. The system 100 generates web pages readable by an archive enabled browser 118 with archives associated with the web pages for improved download time.

The web host 102, in one embodiment, includes hardware and software components for providing web pages to a web client 112. The web host 102 may include a web server application 104, an archiver 106, and a data store 108. The web host 102 may be accessible over a network 110.

The web host 102, in one embodiment, includes a web server application 104. The web server application 104 comprises software configured to deliver web pages over a network. The web server application 104 may be configured to deliver a web page that complies with accepted standards, such as hypertext markup language (HTML) files. Other examples of standards compliant web pages include extensible hypertext markup language (XHTML), hypertext preprocessor (PHP), worldwide web consortium (W3C), and the like. Examples of web server applications include Apache HTTP Server, Microsoft® Internet Information Server®, IBM® HTTP Server, and the like.

The web server application 104, in one embodiment, may be further configured to deliver archives associated with web pages. In one embodiment, these archives comprise objects needed to render the web page. Archives are described in more detail in relation to the archiver 106 below and later in this document.

In one embodiment, the archiver 106 generates web pages optimized for improved downloading times. The archiver 106 may generate one or more archives from objects referenced in the web page. The archives each consist of a plurality of objects referenced in the web page. The term "archive" as used herein means a selection of a plurality of data objects packed into a single file in a sorted or unsorted fashion for a single transmission. When the archive is sent to the web client 112, it may include a single header. In contrast, transmitting each object separately involves a separate header for each object. Since each of the one or more archives include multiple objects, and the archive may be transmitted with a single header in place of the headers for each of the objects in the archive, the total size of required headers is reduced. In another embodiment, the archive may include multiple headers for each object, but these headers are simplified to reduce the total header size.

The web server application 104 may then deliver the single archive in place of each of the individual objects referenced in the web page. Since each object in the archive only requires a simple header or even no longer requires an individual header, and there is no separate wait time associated with each individual object, the overall download time for the web page is reduced.

The web pages generated by the archiver 106, in one embodiment, are capable of being rendered by an archive enabled browser 118. The archive enabled browser 118 is capable of receiving an archive associated with a web page and rendering the web page using the objects unpackaged from the archive. The generated web pages may be in a particular format that requires an archive enabled browser 118 for rendering. For example, the generated web pages may comprise HTML files and one or more associated archives. The archive enabled browser 118 may process the HTML files and the one or more associated archives to render the web pages. The archive enabled browser 118, in one embodiment, processes tags in the HTML files of the web pages and headers in the one or more archives to determine the proper location for objects in the archives. One example of how the archive enabled browser 118 handles the archives is described below in relation to FIG. 6.

The archiver 106, in one embodiment, may generate a web page optimized for use with an archive of objects referenced in the web page (hereinafter "archive optimized web page") from a static web page. Static web pages are web pages with content that does not change in response to parameters associated with the web page. The archiver 106 may generate one or more archives using objects associated with the static web page. In one embodiment, the archiver 106 may generate an archive optimized web page for a static web page in response to a request for the web page by the web client 112.

In another embodiment, the archiver 106 may generate an archive optimized web page for a static web page asynchronously with a request for the web page by the web client 112. In another embodiment, the archiver 106 may generate a batch of archive optimized web pages for a batch of static web pages. The archiver 106 may generate one or more archives for the archive optimized web page. The generated archive optimized web page and the one or more archives for the archive optimized web page may be stored for access by the web host 102. A request for a static web page may result in the delivery of a generated archive optimized web page and archive that were both generated prior to receiving the request for the web page. In this embodiment, the archiver 106 may generate archive optimized web pages and archives while the web host 102 is not under a heavy load.

In another embodiment, the archiver 106 may generate archive optimized web pages and archives for a dynamic web page. A dynamic web page is a web page that is created in response to a request for a web page. Prior to the request, the dynamic web page may not exist. In this embodiment, the archiver 106 generates an archive optimized web page and an archive dynamically in response to a request for the dynamic web page by a web client 112. For example, a web client 112 may request a web page from the web host 102 that includes data from the data store 108 and is created in response to the request. The archiver 106 may receive data from the data store 108 and generate an archive optimized web page and an archive for the web page. The generated web page and archive may then be delivered by the web server application 104 to the web client 112.

In an alternate embodiment, the archiver 106 generates archives that include all of the files required by the archive enabled browser 118 to render the web page. For example, the archiver 106 may generate one or more archives that include all of the required content for a requested web page, and deliver the one or more archives to the archive enabled browser 118 for rendering.

A data store 108, in one embodiment, may be included in the web host 102. Data in the data store 108 may comprise complete web pages, data used to generate web pages, predefined archives, and objects used to render web pages. For example, the data store 108 may comprise one or more hard disk drives containing data files. In another embodiment, the data store 108 comprises a database. In a further embodiment, the data store 108 comprises a flash memory device.

In one embodiment, the network 110 provides a medium for the transmission of data between the web host 102 and the web client 112. The network 110 may transmit requests from the web client 112 to the web host 102. The network 110 may also transmit generated web pages and archives from the web host 102 to the web client 112. The network 110 may be any network capable of transmitting such data, such as the Internet. Other examples of a network 110 include an intranet, a direct network connection, and the like. The web client 112, in one embodiment, renders the generated web page for display. The web client 112 may include a CPU 114, memory 116, and an archive enabled browser 118. The web client 112 renders the generated web page using objects from an archive, in one embodiment.

The archive enabled browser 118, in one embodiment, is a web browser capable of processing an archive containing objects associated with an archive optimized web page. Examples of objects include image files such as a jpeg, gif, bmp, or the like, script files, or other objects used in a web page.

In one embodiment, the archive enabled browser 118 requests a web page from the web host 102. The web page may include references to one or more objects capable of being included in an archive, referred to herein as archivable objects. The web host 102 may deliver a generated web page (i.e. archive optimized web page) that references an archive to the archive enabled browser 118. The archive enabled browser 118 may execute software instructions incorporated into the archive enabled browser 118 (either original object code or added plug-ins or extensions) to retrieve the archive from the web host 102. Additional executable code incorporated into the archive enabled browser 118 (either original object code or added plug-ins or extensions) is executed by the archive enabled browser 118 to unpackage the archivable objects from the archive and render the web page using the archivable objects.

Figure 2:
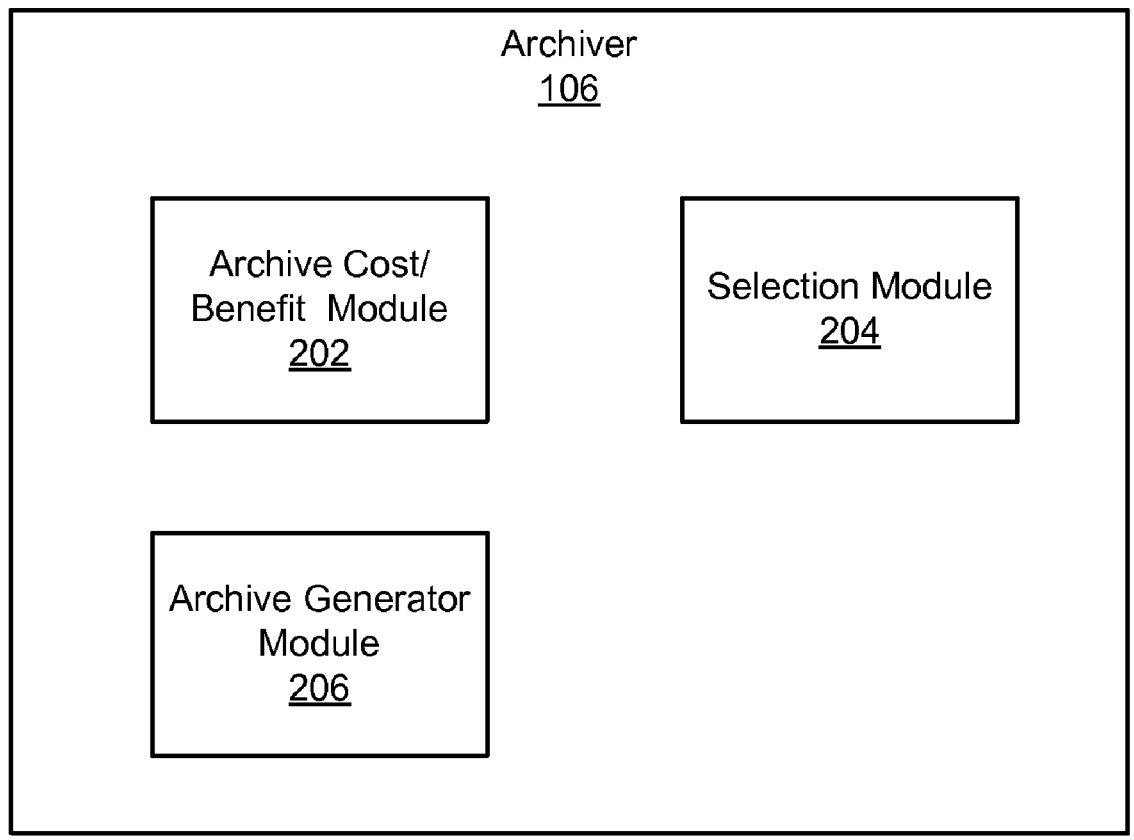
FIG. 2 is a schematic block diagram illustrating one embodiment of an archiver according to the present invention.

FIG. 2 illustrates one embodiment of an archiver 106. The archiver 106 may include an archive cost/benefit module 202, a selection module 204, and an archive generator module 206. The archiver 106 generates archives and associated web pages with improved downloading time.

The archive cost/benefit module 202, in one embodiment, determines if a computational cost associated with generating an archive and an associated archive optimized web page outweighs a benefit of improved download time for the web page. If the projected improvement in downloading time outweighs the overhead cost associated with generating the web page and archive, the archive cost/benefit module 202 may indicate that the archiver 106 should generate the archive optimized web page and an associated archive.

In certain embodiments, the archive cost/benefit module 202 may employ a heuristic function to determine if the archive optimized web page and archive should be generated. For example, the archive cost/benefit module 202 may project a computational cost for generating the archive optimized web page and archive. If the computational cost is below a threshold value, the cost/benefit module 202 may indicate that the archiver 106 should generate the archive optimized web page and archive. In an alternate embodiment, the archive cost/benefit module 202 may also project a value associated with an improvement in download time associated with the archive and archive optimized web page. The cost/benefit module 202 may indicate that the archive optimized web page and archive should be generated in response to a ratio between the projected computational cost and the projected benefit being below a threshold value.

For example, the archive cost/benefit module 202 may derive a cost value based on a model with inputs comprising the number of archives to be generated, the number of archivable objects in the web page and the size of the web page. The archive cost/benefit module 202 may further derive a benefit value that estimates the reduction in time in delivering the web page using an archive relative to the time required to deliver an unmodified web page. The benefit value may be modeled using inputs comprising the number of archives to be generated, the number of archivable objects in the web page and the size of the web page. In this example, the archive cost/benefit module 202 generates a ratio between the cost value and the benefit value. A threshold value for the ratio may be arbitrarily chosen or pre-calculated based on other tests and models, the threshold value determining whether an archive optimized web page should be generated or not generated.

In one embodiment, the determination made by the archive cost/benefit module 202 may be different for an archive optimized web page that must be generated in response to a request for the page than for an archive optimized web page that is generated asynchronously. For example, the archive cost/benefit module 202 may evaluate a static web page during a time of light load on the web host 102 and determine that an archive should be generated for the web page. After generating the archive, requests for the web page will result in the delivery of the asynchronously generated archive and the archive optimized web page. If the request for the web page is received before the archive is generated, however, the archive cost/benefit module 202 may reach a different conclusion, since the archive would need to be generated while the requesting browser waits for the archive. The same archive optimized web page may be determined by the archive cost/benefit module 202 to be too costly to generate when the archive optimized web page must be generated in response to a request for the web page, or when the load on the web host 102 is relatively high.

The selection module 204, in one embodiment, selects objects referenced by the archive optimized web page for inclusion in an archive. The selection module 204 selects objects based on selection criteria that determine whether an object should be in an archive rather than being delivered to the web client 112 separately. One example of a selection criterion is the size of the object, where an object with a smaller size is more likely to benefit from inclusion in an archive than an object with a larger size. In one embodiment, the selection module 204 may select objects with a size below a threshold value. For example, the threshold value may be three kilobytes, and the selection module may select objects with a size below three kilobytes.

In one embodiment, the archive generator module 206 generates one or more archives associated with the archive optimized web page. The archive generator module 206 uses objects selected by the selection module 204 to form the one or more archives. The one or more archives are delivered to the web client 112 in response to requests made by the web client 112 after executing the executable code of the archive enabled browser 118.

Figure 3:
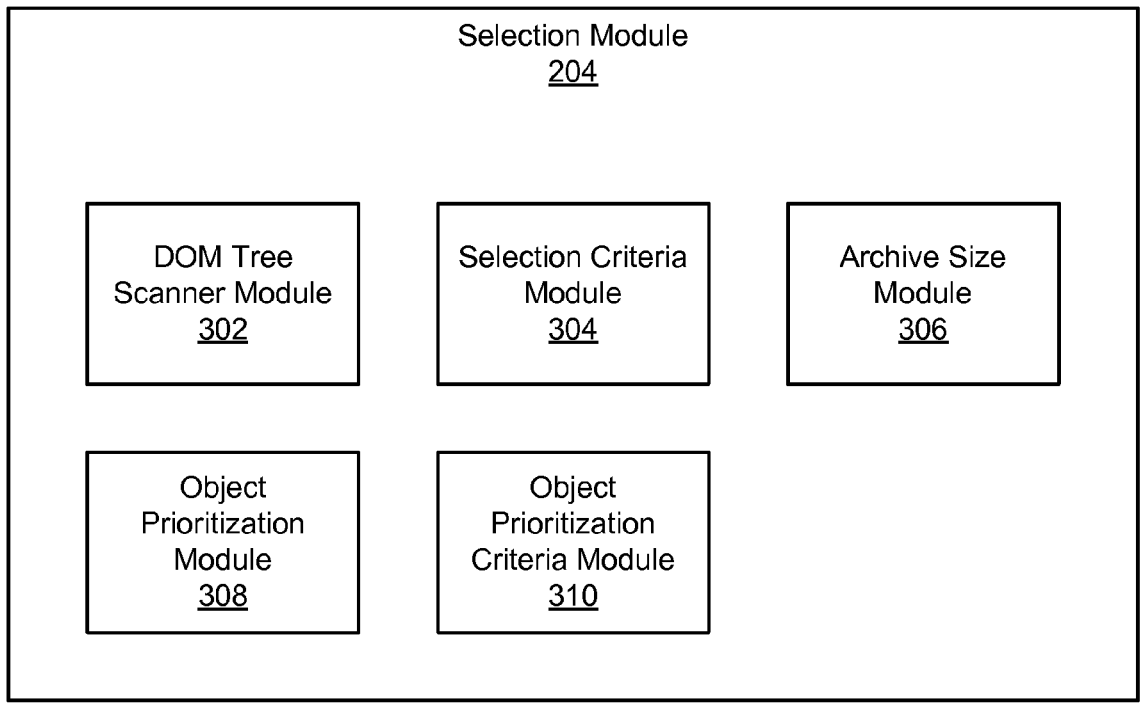
FIG. 3 is a schematic block diagram illustrating one embodiment of a selection module in accordance with the present invention.

FIG. 3 illustrates one embodiment of a selection module 204. The selection module 204 may include a document object model (DOM) tree scanner module 302, a selection criteria module 304, an archive size module 306, an object prioritization module 308, and an object prioritization criteria module 310. The selection module 204 selects archivable objects from the web page for inclusion in one or more archives.

The DOM tree scanner module 302, in one embodiment, scans a DOM tree of a web page. The DOM tree defines the logical structure of the web page. Objects in the web page are arranged in a hierarchical structure in the DOM tree, with some objects depending from other objects, and all objects depending from a root object. By scanning the DOM tree with the DOM tree scanner module 302, the selection module 204 determines information about the objects in the web page such as what objects are referenced by the web page, the types of objects referenced in the web page, the size of the objects, and the relative dependencies between objects referenced in the web page.

In one embodiment, the selection criteria module 304 includes one or more selection criteria that determine whether an object is an archivable object. An archivable object is an object that should be (or has been determined to be) included in an archive. Objects referenced in the web page are judged according to the selection criteria to determine if they are archivable objects. Examples of selection criteria include a maximum size of the object and the type of the object. For example, a selection criteria module 304 may include a criterion that archivable objects should have a size less than three kilobytes. Another criterion may be that an archivable object must be an image file.

The archive size module 306, in one embodiment, determines a target size for an archive. The archive size module 306 may determine the target size for the archive by determining a size of the web page. The size of the web page, in one embodiment, comprises a sum of the sizes of the objects referenced in the web page. In another embodiment, the size of the web page comprises a size of an HTML file for the web page added to a sum of the sizes of the objects referenced in the web page.

The archive size module 306, in one embodiment, sets the target size for the archive to a fraction of the size of the web page. In one embodiment, the target size is one quarter of the size of the web page. Most conventional web browsers are configured to open up to four simultaneous connections to a web server. As a result, an archive that is larger than one quarter the size of the web page will result in diminishing returns to the performance benefit realized by creating an archive. In another embodiment, the target size is a percentage of the overall size of the objects referenced in the web page. In yet another embodiment, the target size is a portion of the size of the web page, and the portion may comprise a ratio, a percentage, or another form of measure such that the generated archive is less than the size of the web page In one embodiment, the object prioritization module 308 determines a priority for archivable objects referenced in the web page. The priority of objects may be determined by object prioritization criteria from the object prioritization criteria module 210. The priority determined by the object prioritization module 308 determines an order for archivable objects in an archive. Archivable objects with a higher priority are ordered before archivable objects with a lower priority. For example, an archivable object defining a table in a web page may be assigned a higher priority than an archivable object consisting of an image in the table. Since the archivable object defining the table has a higher priority than the image, the archivable object defining the table is ordered before the image. By prioritizing and ordering archivable objects, the archive optimized web page may be more efficiently rendered by placing the unpackaged archivable objects as they are unpackaged.

The object prioritization criteria module 310, in one embodiment, includes one or more object prioritization criteria that determine the priority of an object referenced in an archive optimized web page. The object prioritization criteria relate to characteristics of the archivable objects referenced in the archive optimized web page. For example, it may improve the rendering of the page to order objects higher in the DOM tree before objects that are lower in the DOM tree, as an object removed from the archive cannot be rendered before an object upon which it depends is available. Therefore, in one embodiment, a hierarchical level in the DOM tree of an archivable object is an object prioritization criterion. For example, an archivable object that has a relatively high hierarchical level, meaning that it is relatively fewer steps from the root of the DOM tree, may have a higher priority than an archivable object that has a relatively low hierarchical level, meaning that it is relatively more steps from the root of the DOM tree. Consequently, the archivable object with the higher priority is ordered within the archive such that it is unpackaged and rendered earlier.

For the same reason, in another embodiment, an object prioritization criterion may comprise a number of descendent objects in the DOM tree. For example an archivable object with a relatively large number of descendent objects may be assigned a higher priority than an archivable object with a relatively small number of descendent objects. The result of this criterion is an improvement in the likelihood of a prerequisite archivable object being available before a descendent archivable object is removed from the archive.

The greatest increases in performance may be realized when the smallest objects are archived. Therefore, in one embodiment, the size of archivable objects is an object prioritization criterion. For example, if the total size of archivable objects exceeds an archive size determined by the archive size module 306, smaller archivable objects may be assigned a higher priority than relatively large archivable objects. As a result, the smaller archivable objects will be included in the archive to improve the performance of the archive. The relatively large archivable objects may not be placed in the archive due to the size constraint.

Figure 4:
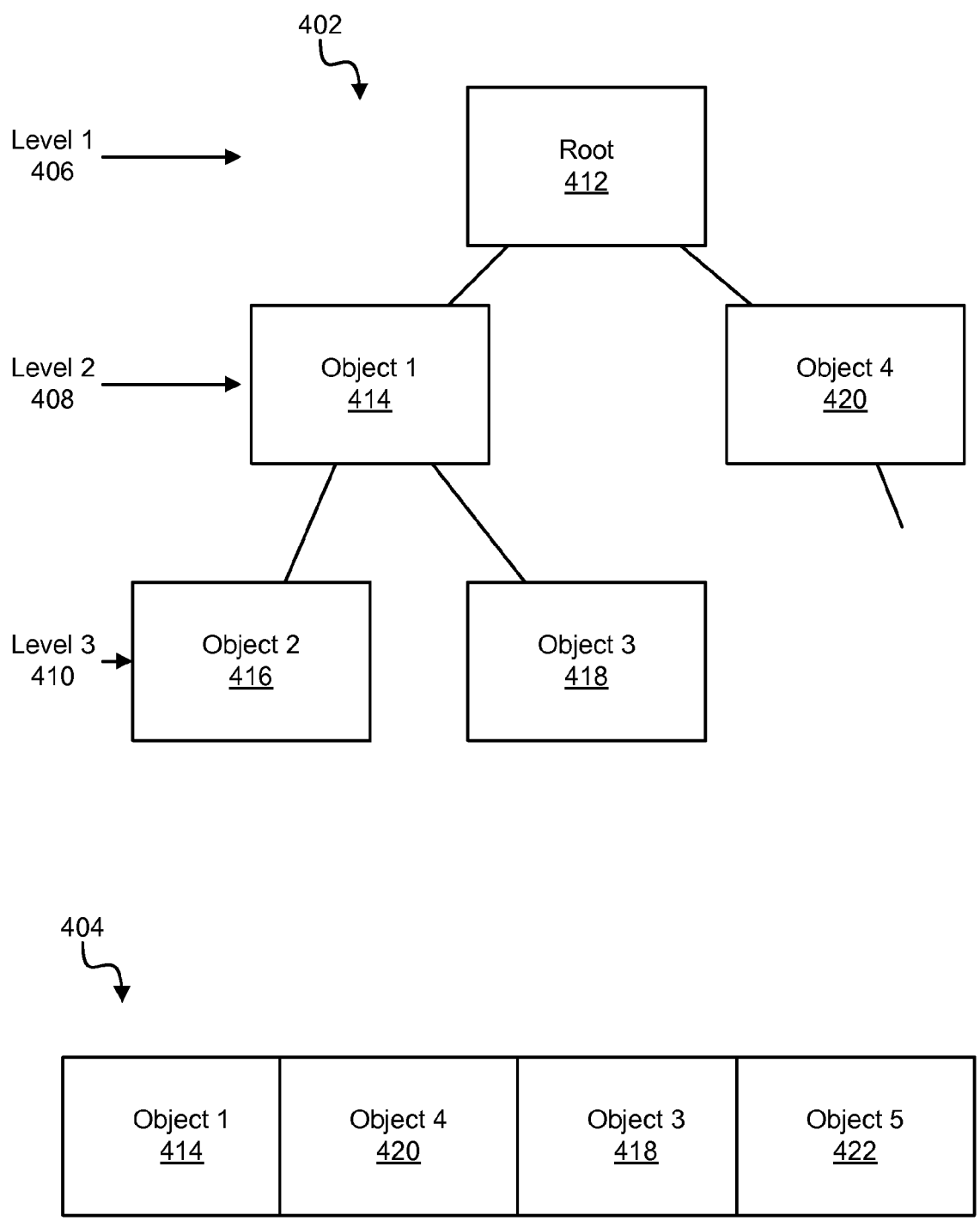
FIG. 4 is a schematic block diagram illustrating one embodiment of a document object model (DOM) tree and ordered archivable objects in accordance with the present invention.

FIG. 4 illustrates one embodiment of a DOM tree 402 for an archive optimized web page and ordered archivable objects 404 for an archive. The DOM tree 402 may include a plurality of objects 412-422 arranged in hierarchical levels 406-410. The DOM tree 402 is a representation of relationships between objects 412-422 in an archive optimized web page. Objects in level 2 408 are dependent on objects in level 1 406, objects in level 3 410 are dependent on a prerequisite object in level 2 408, and so on. For example, object 2 416 in level 3 410 is dependent on object 1 414 in level 2 408.

In one embodiment, an object in a lower level cannot be properly rendered in the archive optimized web page until the prerequisite object is rendered in the archive optimized web page. For example, object 1 414 may be a table in the archive optimized web page, and object 2 416 may represent an image in the table of object 1 414. Since the image of object 2 416 is defined to be in the table of object 1 414, it cannot be rendered in the archive optimized web page before the table is rendered.

As a result of these dependencies and other considerations, archivable objects selected by the selection module 204 may be prioritized and ordered by the object prioritization module 308 as ordered archivable objects 404. For example, the object selection module 204 may determine that object 1 414, object 3 418, object 4 420, and object 5 meet a set of selection criteria and designate these objects as archivable objects. The object selection module 204 may also determine that object 2

416 does not meet a set of selection criteria, for example, object 2 416 may have a size greater than a threshold value.

The selection module 204 may further order the archivable objects into ordered archivable objects 404. The object prioritization module 308 may order the archivable objects according to object prioritization criteria. For example, object 1 414 and object 4 420 may be assigned a high priority due to their relatively high position in the DOM tree 402 at level 2 408. Object 1 414 may be assigned a higher priority than Object 4 420 as object 1 414 has more dependent objects than object 4 420. As a result, Object 1 414 may be ordered before object 4 420 in the ordered archivable objects 404.

Figure 5:
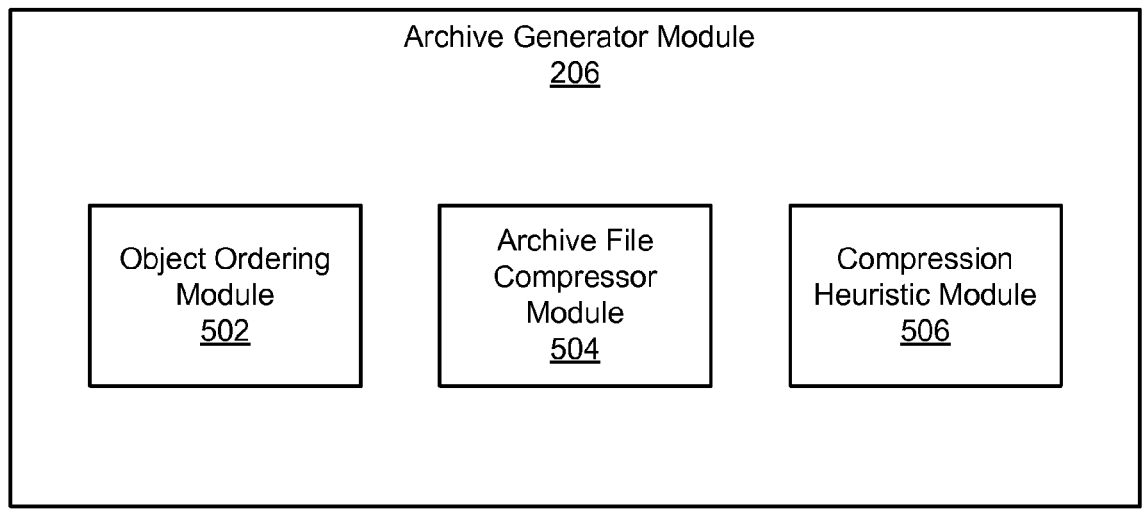
FIG. 5 is a schematic block diagram illustrating one embodiment of an archive generator module in accordance with the present invention.

FIG. 5 illustrates one embodiment of an archive generator module 206. The archive generator module 206 may include an object ordering module 502, an archive compressor module 504 and a compression heuristic module 506. The archive generator module 206 generates archives files using archivable objects selected by the selection module 204.

The object ordering module 502, in one embodiment, orders archivable objects according to the priority of the archivable objects. The priority of the archivable objects may be determined by the object prioritization module 308 according to object prioritization criteria. The object ordering module 502 orders the archivable objects such that relatively high priority archivable objects are ordered before relatively low priority archivable objects in the generated archive.

In one embodiment, the archive compressor module 504 compresses the generated archive. The file compressor module 504 may compress the generated archive using any data compression method. Examples of data compression methods that may be used to compress the archive include gzip, zip, LZX, arithmetic coding, and the like.

The archive generator module 206 may rely on a compression heuristic module 506 to determine if a generated archive should be compressed. Under certain circumstances, compressing the archive may prove inefficient. For example, many image files, such as jpeg files, are pre-compressed. If the archivable objects that make up the archive include a high proportion of pre-compressed image files, processing the archive with an additional compressor will result in a computational cost, but a relatively modest improvement in the size of the archive.

Another example of a circumstance in which a generated archive may not be compressed occurs during archive generation of dynamic web pages. When archives are generated for dynamic archive optimized web pages, the server load may be high on the web host 102. The computational cost and time required to compress the archive while the requesting web client 112 waits may outweigh the reduction in size of the archive.

In order to avoid attempts to compress a generated archive when the cost of compression outweighs the benefit of reduction in size of the archive, the compression heuristic module 506, in one embodiment, determines when an archive should be compressed. For example the compression heuristic module 506 may determine a proportion of images in the archive. When the proportion of images in the archive is below a threshold level, the compression heuristic module 506 may determine that the archive should be compressed.

Figure 6:
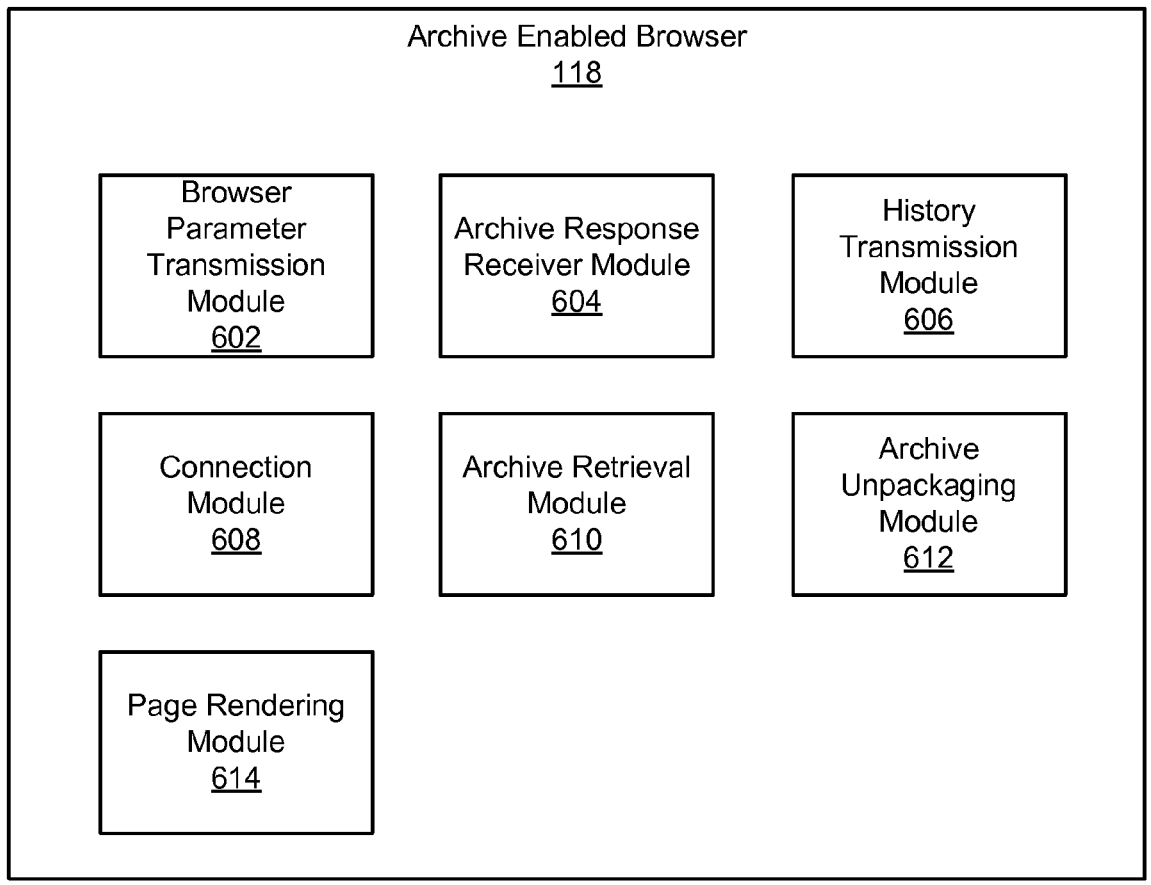
FIG. 6 is a schematic block diagram illustrating one embodiment of an archive enabled browser in accordance with the present invention.

FIG. 6 illustrates one embodiment of an archive enabled browser 118. The archive enabled browser 118 may include a browser parameter transmission module 602, an archive response receiver module 604, a history transmission module 606, a connection module 608, an archive retrieval module 610, an archive unpackaging module 612, and a page rendering module 614. The archive enabled browser 118 retrieves and renders an archive optimized web page that uses archives.

The archive optimized web page retrieved and rendered by the archive enabled browser 118, in one embodiment, may be the first instance of the web page. For example, the archive optimized web page may be generated dynamically in response to a request from a web client 112. In another example, the archive optimized web page retrieved and rendered by the archive enabled browser 118 may be generated in response to a design of the web page by a web designer. In this example, the archiver 106 may be linked to or integrated with web design software.

In another embodiment, web page retrieved and rendered by the archive enabled browser 118 may be an existing web page that does not include references to an archive. In this embodiment, the existing web page is rewritten to include references to an archive. For example, the archive generator module 206 may access a static web page and generate an archive using archivable objects and the associated archive optimized web page. In another example, the archive generator module 206 may operate on a dynamically generated web page that does not include references to an archive. In this example, the dynamically generated web page is rewritten to create an archive optimized web page that can be rendered using archivable objects from an archive.

The archive optimized web page may include HTML tags linked to archivable objects in an archive. For example, if the archive name is "html.archive" and an archivable object name in the archive is "obj1", a uniform resource identifier (URI) in the HTML tag may be "html.archive/obj1".

The browser parameter transmission module 602, in one embodiment, transmits one or more browser parameters relating to the capabilities of the archive enabled browser to a web server 104. The one or more browser parameters may include indicators. In one embodiment, the browser parameter transmission module 602 sends a browser parameter comprising an indicator that indicates that the archive enabled browser 118 is capable of receiving and/or rendering an archive optimized web page that includes an archive. For example, the browser parameter transmission module 602 may send an indicator explicitly indicating that the archive enabled browser 118 is capable of rendering pages using an archive. In another example, the browser parameter transmission module 602 may send a version number of the archive enabled browser 118. The web server 104 may compare this version number against a list of browsers known to be capable of rendering archive optimized web pages that include archives, and determine the capabilities of the archive enabled browser as a result of that comparison.

In another embodiment, the browser parameter transmission module 602 sends a browser parameter comprising an indicator that indicates a number of connections available for use by the archive enabled browser 118. For example in one embodiment, the archive enabled browser 118 has a number of connections available dictated by a host computer and/or operating system. The archive enabled browser 118 may be allowed a maximum of four connections in one example. The browser parameter transmission module 602 may send a browser parameter to the web server 104 indicating that the archive enabled browser 118 has four connections available.

In one embodiment, the archive response receiver module 604 receives an archive response parameter from the web server 104. The archive response parameter, in one embodiment, comprises an indicator. The indicator may indicate that the web server 104 is capable of delivering an archive. In one embodiment, the web server 104 sends the archive response parameter in response to a determination that the archive enabled browser 118 is capable of receiving an archive. In another embodiment, the web server 104 sends the archive response parameter regardless of the type of web browser that requests a web page.

The history transmission module 606, in one embodiment, transmits a history of the archive enabled web browser 118 to the web server 104. In one embodiment, the history comprises a list of objects retained by the archive enabled browser from previous transactions with the web server 104 and/or other web servers. Objects retained may be stored in volatile storage caches such as memory or in nonvolatile storage caches such as hard disk drives. In one embodiment, the history transmission module 606 transmits the history in response to the receipt of an archive response parameter that indicates that the web server 104 is capable of delivering archives.

The web server 104, in one embodiment, uses the history to generate archives and archive optimized web pages that use the cached version of objects for a requested web page. For example, the history may indicate that several objects in the requested archive optimized web page are already present in the cache of the archive enabled browser 118. The archiver 106 may generate an archive that does not include the cached objects. The web server 104 may send an archive optimized web page that directs the archive enabled browser 118 to render the archive optimized web page using objects in the cache of the archive enabled browser 118.

The connection module 608, in one embodiment, opens one or more connections between the archive enabled browser 118 and the web server 104. In one embodiment, the connection module 608 opens a number of connections equal to the number of connections available to the archive enabled browser 118. In another embodiment, the connection module 608 opens a number of connections equal to a number of connections available for use by the web server 104. In another embodiment, the connection module 608 opens a number of connections negotiated between the web server 104 and the archive enabled browser 118.

For example, the requested archive optimized web page may include a number of archives lower than the number of connections available to web server 104 and the archive enabled browser 118. In this example the connection module 608 may establish a number of connections equal to the number of archives.

The archive retrieval module 610, in one embodiment, retrieves an archive through one available connection. The archive retrieval module 610 may cause a web client 112 to retrieve an archive for the archive optimized web page from the web host 102. Once retrieved, web client 112 store the archive on a client device in temporary or persistent memory.

In one embodiment, the archive unpackaging module 612 unpackages an archive. The archive unpackaging module 612 may include instructions to cause the web client 112 to locate and unpackage the archive retrieved. Unpackaging the archive, in one embodiment, comprises extracting archivable objects from the archive. The archive unpackaging module 612 stores the archivable objects in temporary or persistent memory.

The archivable objects may be extracted in order, meaning that archivable objects are extracted in the order determined by the object prioritization module 308 or in the order determined by the object ordering module 502. In one embodiment, the archive has been compressed by the archive generator module 206. The archive unpackaging module 612 may decompress the archive or objects within the archive.

In one embodiment, the page rendering module 614 renders the archive optimized web page using archivable objects extracted from archives. The page rendering module 614 may include instructions to cause the archive enabled browser 118 to render the archive optimized web page using archivable objects extracted from archives.

Figure 7:
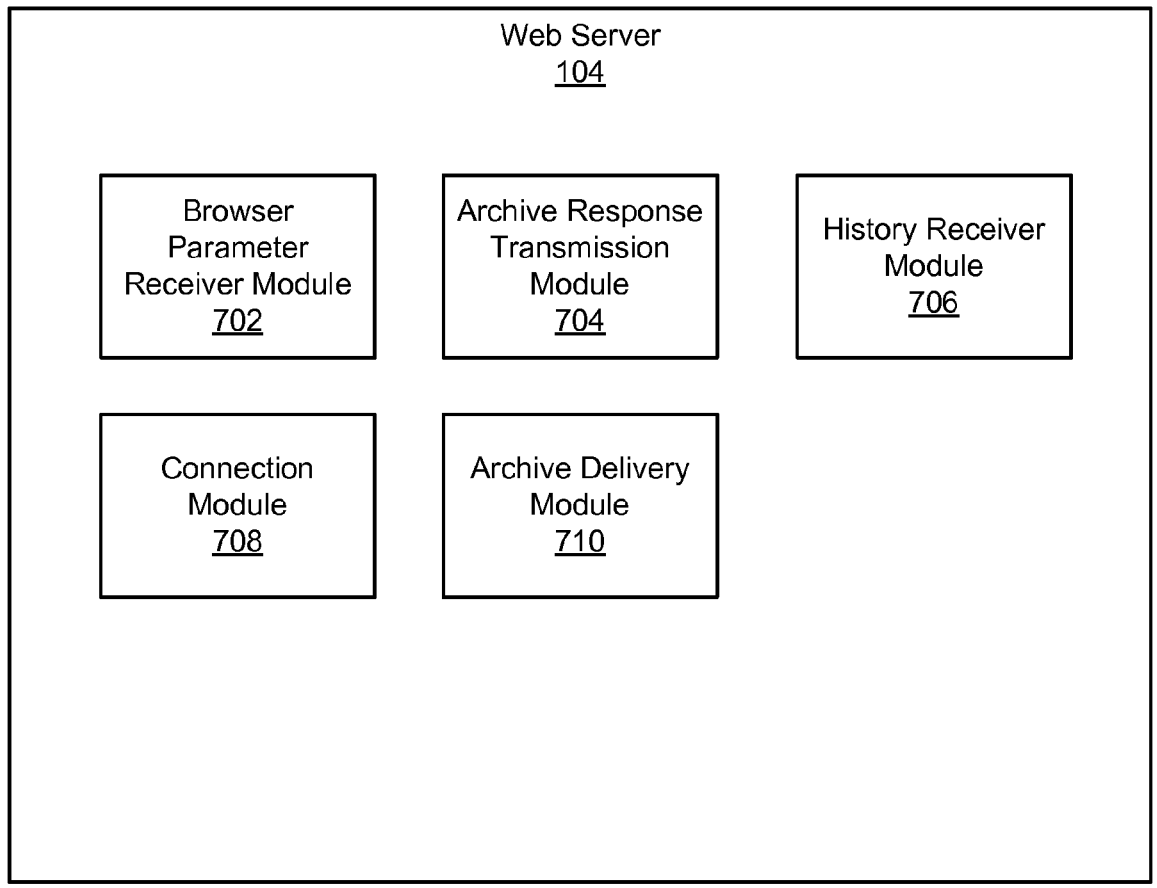
FIG. 7 is a schematic block diagram illustrating one embodiment of web server in accordance with the present invention.

FIG. 7 illustrates one embodiment of a web server 104 in accordance with the present invention. The web server 104 may include a browser parameter receiver module 702, an archive response transmission module 704, a history receiver module 706, a connection module 708, and an archive delivery module 710. The web server 104 receives a request for a web page and delivers the web page using one or more archives.

The browser parameter receiver module 702, in one embodiment, receives a browser parameter from an archive enabled browser 118 that indicates the capabilities of the archive enabled browser 118. The nature of the browser parameter received by the browser parameter module 702 is substantially the same as the browser parameter described in relation to the browser parameter transmission module 602 disclosed in relation to FIG. 6. The receipt of a browser parameter may indicate that the archive enabled browser 118 is capable of receiving an archive and/or indicate the number of connections available to the archive enabled browser 118.

The archive response transmission module 704 transmits an archive response to the archive enabled browser 118 in one embodiment. The archive response parameter may comprise an indicator indicating that the web server 104 is capable of delivering archives. In one embodiment, the archive response parameter may comprise an indicator indicating a number of connections available to the web server 104. In one embodiment, the web server 104 sends the archive response parameter in response to a determination that the archive enabled browser 118 is capable of receiving archives. In another embodiment, the web server 104 sends the archive response parameter regardless of the type of web browser that requests a web page.

The history receiver module 706, in one embodiment, receives a history from the archive enabled browser 118. In one embodiment, the history is substantially as described above in relation to FIG. 6. The web server 104 may use the history to determine what objects must be transmitted to the archive enabled browser 118, and what objects may be referenced from the cache of the archive enabled browser 118. For example, the archiver 106 may use the history to generate one or archives that exclude one or more objects in the history (or cache), thus reducing the total size of the objects transmitted to the archive enabled browser 118 and reducing load time for the web page.

In one embodiment, the connection module 708 opens one or more connections between the archive enabled browser 118 and the web server 104. In one embodiment, the connection module 708 opens a number of connections equal to the number of connections available to the archive enabled browser 118. In another embodiment, the connection module 708 opens a number of connections equal to a number of connections available for use by the web server 104. In another embodiment, the connection module 708 opens a number of connections negotiated between the web server 104 and the archive enabled browser 118. For example, the requested web page may include a number of archives lower than the number of connections available to web server 104 and the archive enabled browser 118. In this example the connection module 708 may establish a number of connections equal to the number of archives.

The archive delivery module 710, in one embodiment, sends an archive through one available connection. The archive delivery module 710 may cause the web server 104 to send an archive for the archive optimized web page to the archive enabled browser 118.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
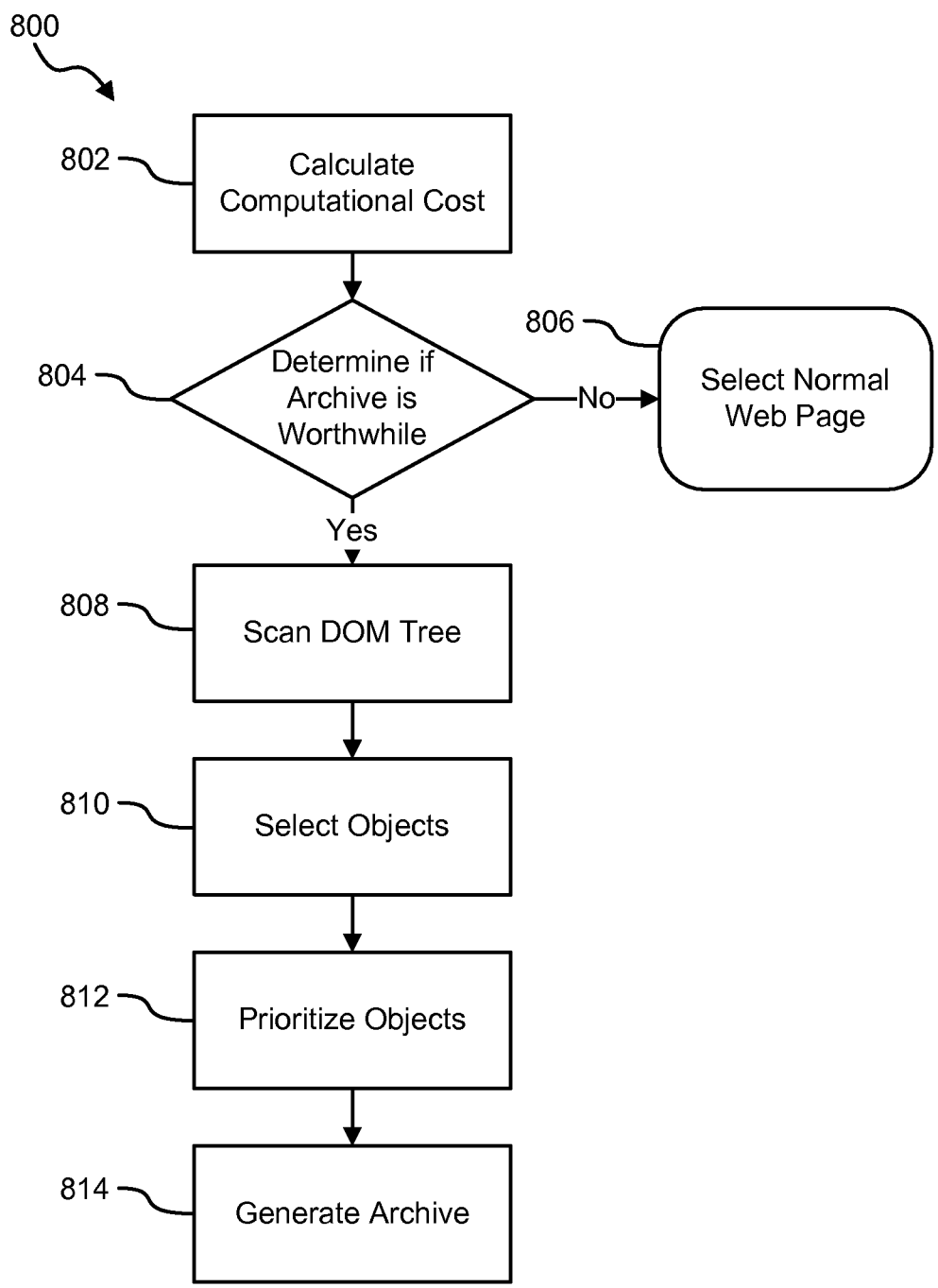
FIG. 8 is a schematic flow chart diagram illustrating one embodiment of a method for improving the download time of a web page in accordance with the present invention.

FIG. 8 is a flow chart diagram showing the various steps in a method 800 for improving the download time of a web page. The method 800 is, in certain embodiments, a method used in the system and apparatus of FIGS. 1-7, and will be discussed with reference to those figures. Nevertheless, the method 800 may also be conducted independently thereof and is not intended to be limited specifically to the embodiments discussed above with respect to those figures.

As shown in FIG. 8, the method 800 calculates 802 a computational cost associated with generating an archive for the web page. In one embodiment, the computational cost is a measure of the resources required to generate an archive and an archive optimized web page configured to access archivable objects in the archive. In an alternate embodiment, the calculated 802 computational cost may be a ratio between a measure of the resources required to produce the archive and archive optimized web page and a measure of the improvement in the download time of the web page realized by using an archive. In another embodiment, the calculated 802 computational cost may vary in response to parameters such as the load on the web host 102, whether the web page has already been requested by a web client 112, and whether the web page is a static web page.

The archive cost/benefit module 202 then determines 804 if generating an archive for the web page is worthwhile in one embodiment. The determination 804 may be based on the calculated 802 computational cost and a threshold value. For example, the archive cost/benefit module 202 may determine that generating an archive is worthwhile when a ratio of computational cost to performance benefit is below a threshold value.

The method 800 selects 806 a normal web page if the determination 804 is negative. A normal web page is a web page that does not include references to an archive. In one embodiment, the method 800 may generate a normal web page. In an alternate embodiment, the method 800 may select 806 an existing normal web page.

Next, the selection module 204 scans 808 a DOM tree representation of the web page if the archive cost/benefit module 202 determines 804 that an archive should be generated. The DOM tree is scanned 808 to determine what objects are in the web page and other parameters about the objects, such as size of the objects, hierarchical level of the objects, and dependencies between the objects.

The selection module 204 then selects 810 objects as archivable objects. Archivable objects are selected 810 in response to meeting object selection criteria, such as size or type of the object. For example, the selection module 204 may select 810 an object as an archivable object in response to the size of the object being less than three kilobytes.

The object prioritization module 308 prioritizes 812 archivable objects selected 810 by the selection module 204. Prioritization 812 of the archivable objects is based on object prioritization criteria, such as relative depth in the DOM tree, number of dependent objects, and the like. For example, one object may have a higher priority than another object because it has more dependent objects in the DOM tree.

The archive generator module 206 then generates 814 archives using the archivable objects. The archivable objects in the generated 814 archive may be ordered in the generated archive according to the priority of the objects assigned during prioritization 812. As a result, an archivable object with a higher priority may appear in the archive before an object with a lower priority.

The compression heuristic module 506 may determine 815 if compression is worthwhile for the archive in one embodiment. The type of files in the archive, the number of files in the archive, the size of the archive, and other factors may influence the determination 815 as described in relation to FIG. 5. The method 800 selects 818 the uncompressed archive in response to a determination 815 that compression is not worthwhile for the archive.

In one embodiment, the archive compressor module 504 compresses 816 the generated archive in response to a determination 815 that compression is worthwhile for the archive. Compression 816 of the archive may use any compression method, such as gzip, zip, LZX, arithmetic coding, or the like. Compression 814 of the archive may occur in response to a determination that the file will benefit from compression. For example, the method 800 may determine that the archivable objects include a high proportion of already compressed image files, and therefore determine that the archive should not be compressed.

Figure 9:
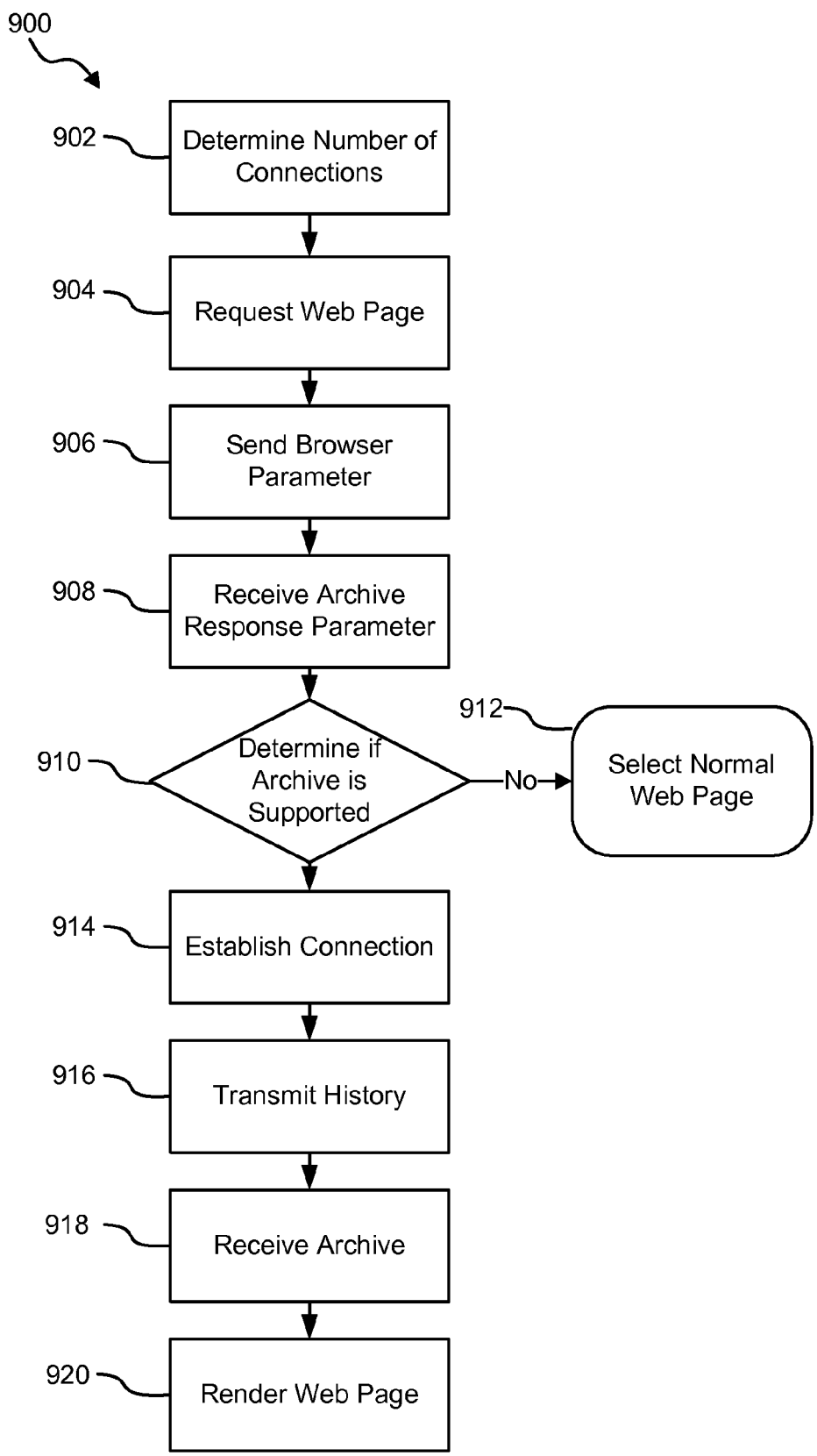
FIG. 9 is a schematic flow chart diagram illustrating one embodiment of a method for improving the download time of a web page in a web browser in accordance with the present invention.

FIG. 9 is a flow chart diagram showing the various steps in a method 900 for improving the download time of a web page in an archive enabled web browser 118. The method 900 is, in certain embodiments, a method used in the system and apparatus of FIGS. 1-7, and will be discussed with reference to those figures. Nevertheless, the method 900 may also be conducted independently thereof and is not intended to be limited specifically to the embodiments discussed above with respect to those figures.

As shown in FIG. 9, the method 900 determines 902 a number of connections available to the archive enabled browser 118. The number of connections available may be dependent on the archive enabled browser 118, the web client 112, the network 110, or other considerations.

The archive enabled browser 118 requests 904 a web page. Requesting 904 a web page, in one embodiment, comprises sending a request to a web host 102 over a network 110. For example, the archive enabled browser 118 may send an HTTP request over a TCP/IP network to request 904 a web page.

The browser parameter transmission module 602, in one embodiment, sends 906 a browser parameter to the web server 104. The browser parameter sent 906 to the web server 104 may comprise one or more indicators indicating that the archive enabled browser 118 is capable of receiving an archive, the number of connections available to the archive enabled browser 118, or other indicators.

Next, the archive response receiver module 604 receives 908 an archive response parameter. The archive response parameter may indicate that the web server 104 is capable of delivering an archive. The archive response parameter may further indicate the number of connections available to the web server 104, or other indicators.

The archive enabled web browser 118 then determines 910 if archives are supported. In one embodiment, the determination 910 is in response to a received 908 archive response parameter. If the archive enabled web browser 118 determines 910 that archives are not supported, the method 900 uses 912 a normal web page without archives. If the archive enabled web browser 118 determines 910 that archives are supported, the method 900 continues.

The connection module 608 establishes 914 one or more connections with the web server 104. In one embodiment, the number of connections established 914 is in response to browser parameters, archive response parameters, or other considerations as described above in relation to FIGS. 6 and 7. The connections established 914 are used for the transmission of archives, web pages, history information, parameters, or other data.

The history transmission module 606 may transmit 916 history information of the archive enabled browser 118 to the web server 104. In one embodiment, the history transmitted 916 comprises a list of objects retained by the archive enabled browser from previous transactions with the web server 104 and/or other web servers. In one embodiment, the history transmission module 606 transmits 916 the history in response to the receipt of an archive response parameter that indicates that the web server 104 is capable of delivering archives.

The archive retrieval module 610 receives 918 an archive from the web server 104. The received archive may comprise one or more archivable objects as described above. In one embodiment, the archive file is received 918 in response to a request 904 for a web page.

The archive unpackaging module 612 may decompress 919 the archive in response to the delivered archive being compressed in one embodiment. Decompressing 919 the archive may include decompressing the archive using the compression method used by the compressor module 504.

In one embodiment, the page rendering module 614 renders 920 the web page using archivable objects extracted from the received 918 archives. The page rendering module 614 may include software instructions to cause the archive enabled browser 118 to render 920 the archive optimized web page using archivable objects extracted from archives. Rendering 920 the archive optimized web page may comprise displaying the archivable objects on a display in a position defined for the archive optimized web page.

Figure 10:
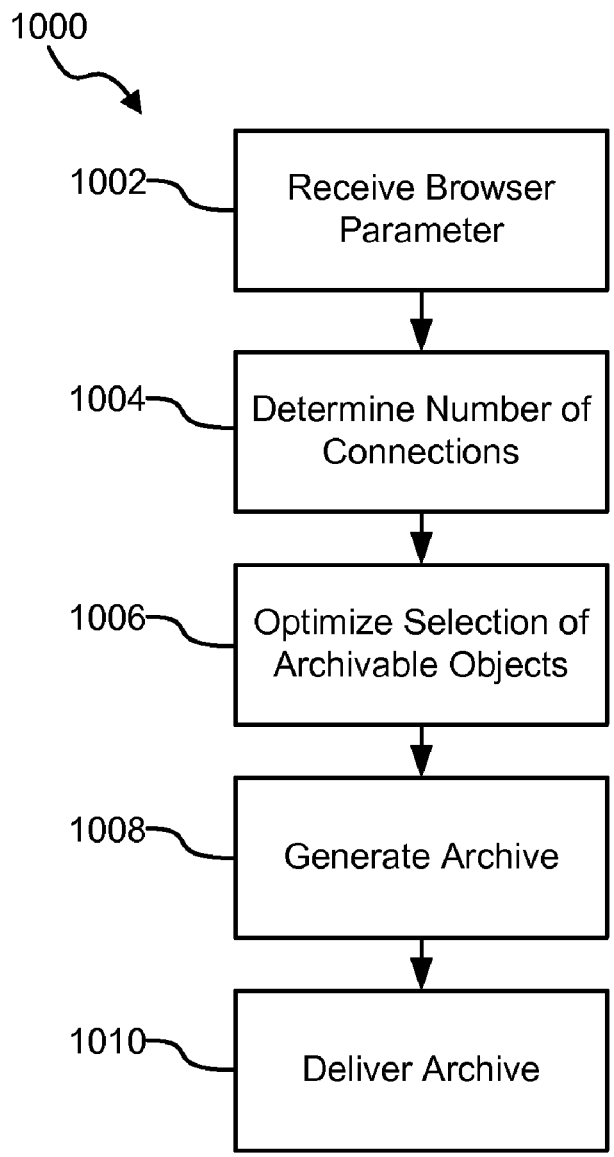
FIG. 10 is a schematic flow chart diagram illustrating one embodiment of a method for improving the download time of a web page in a web server in accordance with the present invention.

FIG. 10 is a flow chart diagram showing the various steps in a method 1000 for improving the download time of a web page in a web server 104. The method 1000 is, in certain embodiments, a method used in the system and apparatus of FIGS. 1-7, and will be discussed with reference to those figures. Nevertheless, the method 1000 may also be conducted independently thereof and is not intended to be limited specifically to the embodiments discussed above with respect to those figures.

As shown in FIG. 10, the method 1000 includes receiving 1002 a browser parameter by a browser parameter receiver module 702. The browser parameter may be received 1002 from an archive enabled web browser 118 and may include one or more indicators that indicate capabilities of the browser. The indicators may indicate the ability of the archive enabled web browser 118 to render an archive optimized web page using an archive. The indicators may also indicate the number of connections available to the archive enabled web browser 118.

The web server 104 may determine 1004 a number of connections to use for delivering the archive optimized web page, including one or more archives. In one embodiment, the web server 104 may determine 1004 the number of connections in response to one or more of a browser parameter indicating the number of connections available to the archive enabled web browser 118, a number of connections available to the web server 104, performance considerations, or the like.

The archiver 106 may optimize 1006 a selection of archivable objects. In one embodiment, the archiver 106 optimizes 1006 the selection in response to one or more of the size of the archivable objects, the relative height of the archivable objects in a DOM tree, dependencies between archivable objects, the number of archives being generated, or other considerations. In one embodiment, the archivable objects are optimized 1006 as described in relation to FIGS. 2-5.

The archiver 106 may generate 1008 one or more archives. The one or more archives may be generated 1008 using the optimized 1006 selection of archivable objects. The number of archives generated may be related to the number of connections determined 1004 previously. In another embodiment, the number of archives generated 1008 may impact the determination 1004 of the number of connections to use.

The archive delivery module 710, in one embodiment of the method 1000, delivers 1010 the one or more archives to the archive enabled web browser 118. In one embodiment, the archive delivery module 710 delivers 1010 the one or more archives using a network 110, such as a TCP/IP network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for reducing loading time of a web page, the system comprising:
    a web server configured to:
        deliver a plurality of archive files to a browser such that the browser renders a requested web page using archivable objects from the plurality of archive files, wherein each of the plurality of archive files comprises a plurality of archivable objects referenced within the web page; and
    an archiver configured to:
        receive a browser parameter comprising an indicator that the browser is configured to receive the plurality of archive files;
        determine a number of connections between the web server and the browser to use to deliver the plurality of archive files required by the web page, the number of connections comprising a plurality of connections; and
        generate the plurality of archive files from the plurality of archivable objects, a number of archive files in the generated plurality of archive files equal to the determined number of connections, the web server delivering the plurality of archive files to the browser, an archive file from the plurality of archive files delivered through an available one of the determined number of connections.

2. The system of claim 1, wherein the archiver determines archive response parameters compatible with capabilities of the browser to determine the number of connections to use to deliver the plurality of archive files.

3. The system of claim 1, wherein the archiver determines response parameters compatible with capabilities of the browser by:
  transmitting an archive response parameter to the browser, wherein the archive response parameter comprises an indicator that the archiver is configured to generate the plurality of archive files and available connections for the web server; and
  determining a maximum number of connections to use to deliver the plurality of archive files.

4. The system of claim 1, wherein the browser is further configured to send a browser parameter to the web server by transmitting a list of pre-cached objects present in a browser cache from previous interactions with the web server, the pre-cached objects associated with the web page.

5. The system of claim 4, wherein the archiver determines archive response parameters compatible with the capabilities of the browser by:
  comparing the list of pre-cached objects present in the browser cache to the archivable objects referenced in the web page;
  determining absent archivable objects that are absent from the list of pre-cached objects; and
  selecting the absent archivable objects that are absent from the browser cache for inclusion in the plurality of archive files.

6. A method for reducing loading time of a web page, the method comprising:
  receiving a browser parameter comprising an indicator that a browser is configured to receive a plurality of archive files;
  determining a number of connections between a web server and a browser to use to deliver the plurality of archive files, the plurality of archive files required by a web page, each archive file comprising a plurality of archivable objects referenced within the web page, the number of connections comprising a plurality of connections;
  generating a number of archive files in the plurality of archive files equal to the determined number of connections to use to deliver the plurality of archive files; and
  delivering the plurality of archive files to the browser, an archive file from the plurality of archive files delivered through an available one of the determined number of connections.

7. The method of claim 6, further comprising optimizing a selection of archivable objects for the plurality of archive files, wherein the browser parameter comprises an indicator indicating a number of virtual connections available for use by the browser and optimizing the selection of archivable objects comprises selecting archivable objects for inclusion in the plurality of archive files to be generated by the archiver, the content of the plurality of archive files comprising one or more archivable objects from the web page according to an object prioritization.

8. The method of claim 6 wherein generating the number of archive files in the plurality of archive files further comprises compressing the plurality of archive files.

9. The method of claim 7, wherein optimizing the selection of archivable objects further comprises scanning a document object model (DOM) tree indicating the structure of the web page to determine the objects referenced within the web page.

10. The method of claim 9, wherein optimizing the selection of archivable objects further comprises assigning a priority to the archivable objects according to a prioritization criteria.

11. The method of claim 10, wherein the prioritization criteria comprises a number of descendent objects of the object in the DOM tree.

12. The method of claim 10, wherein the prioritization criteria comprises a hierarchical level of the object in a document object master (DOM) tree.

13. The method of claim 10, wherein selecting the archivable objects for inclusion in the plurality of archive files comprises selecting an archivable object for inclusion in response to a determination that a size of the archivable object is less than a threshold size.

14. The method of claim 10, wherein generating the number of archive files in the plurality of archive files further comprises sorting the archivable objects in the plurality of archive files according to priority, such that higher priority archivable objects are closer to a beginning of an archive file in the plurality of archive files than lower priority archivable objects.

15. A method for reducing loading time of a web page, the method comprising:
  requesting a web page from a web server through a browser;
  sending a browser parameter to the web server, the browser parameter comprising an indicator that the browser is configured to receive a plurality of archive files;
  receiving the plurality of archive files required by the web page over a number of connections between the web server and the browser, the number of connections comprising a plurality of connections, a number of archive files in the plurality of archive files equal to the number of connections, an archive file from the plurality of archive files received through an available one of the number of connections, the plurality of archive files each comprising a plurality of archivable objects referenced by the web page; and
  rendering the web page using the plurality of archivable objects from the plurality of archive files.

16. The method of claim 15 further comprising receiving an archive response parameter from the web server, the archive response parameter comprising an indication that the web server is capable of delivering the plurality of archive files.

17. The method of claim 15, further comprising determining the number of connections available for use by the browser to receive the web page.

18. The method of claim 15, wherein rendering the web page further comprises extracting archivable objects from the plurality of archive files.

19. The method of claim 15, wherein rendering the web page further comprises decompressing a compressed archive file from the plurality of archive files.

20. The method of claim 17 wherein requesting the web page from the web server further comprises sending a browser parameter comprising a connections indicator, the connections indicator indicating the number of connections available for use by the browser to receive portions of the web page.

21. The method of claim 20, further comprising establishing the number of connections between the web server and the browser according to an archive response parameter from the web server and the number of connections available for use by the browser.

22. A computer program product comprising a non-transitory computer readable medium having computer usable program code programmed for reducing loading time of a web page, the operations of the computer program product comprising:

determining a number of connections available between a web server and a browser available for use by the browser to receive a web page, the number of connections comprising a plurality of connections;

requesting a web page from the web server, wherein requesting a web page from a web server comprises sending a browser parameter comprising an indicator indicating that the browser is capable of receiving a plurality of archive files establishing the number of connections between the web server and the browser according to the browser parameter;

receiving the plurality of archive files from the web server, a number of archive files in the plurality of archive files equal to the number of connections, an archive file from the plurality of archive files received through an available one of the number of connections, the plurality of archive files each comprising a plurality of archivable objects associated with the web page; and rendering the web page using the plurality of archivable objects from the plurality of archive files.

23. A computer program product comprising a non-transitory computer readable medium having computer usable program code programmed for reducing loading time of a web page, the operations of the computer program product comprising:

determining a number of archive files to generate, the number of archive files comprising a plurality of archive files equal to a number of connections between a web server and a web browser, the number of connections comprising a plurality of connections;

receiving a browser parameter comprising an indicator that the web browser is configured to receive the plurality of archive files;

selecting archivable objects for inclusion in the plurality of archive files to be generated, the selected archivable objects comprising one or more archivable objects associated with the web page according to an object prioritization;

generating the plurality of archive files, the plurality of archive files comprising the selection of archivable objects; and delivering the plurality of archive files from the web server to the web browser, an archive file from the plurality of archive files delivered through an available one of the number of connections.

* * * * *